(12) United States Patent
Lee (10) Patent No.: US 7,292,026 B2
(45) Date of Patent: Nov. 6, 2007

(54) SIGNAL CONDITIONING SYSTEM FOR INDUCTIVE POSITION SENSOR

(75) Inventor: Joong K. Lee, Chatham (CA)

(73) Assignee: KSR International Co., Ontario (CA)

( * ) Notice: Subject to any disclaimer, the term of this patent is extended or adjusted under 35 U.S.C. 154(b) by 82 days.

(21) Appl. No.: 11/400,154

(22) Filed: Apr. 7, 2006

(65) Prior Publication Data

US 2006/0255794 A1    Nov. 16, 2006

Related U.S. Application Data

(60) Provisional application No. 60/699,478, filed on Apr. 8, 2005.

(51) Int. Cl.
*G01B 7/30* (2006.01)

(52) U.S. Cl. .............................. 324/207.17; 324/207.25

(58) Field of Classification Search ................................ 324/207.11–207.25; 123/399
See application file for complete search history.

(56) References Cited

U.S. PATENT DOCUMENTS

| | | | |
|---|---|---|---|
| 3,662,257 A | 5/1972 | Fujiwara | |
| 3,777,255 A | 12/1973 | Young | |
| 3,852,661 A | 12/1974 | Szabo | |
| 4,005,396 A | 1/1977 | Fujiwara | |
| 4,013,911 A | 3/1977 | Fujiwara | |
| 4,071,818 A | 1/1978 | Krisst | |
| 4,080,592 A | 3/1978 | Zabler | |
| 4,140,998 A * | 2/1979 | Bettle .................... | 340/870.36 |
| 4,156,192 A | 5/1979 | Schedrovitsky | |
| 4,170,754 A | 10/1979 | Schmitz | |
| 4,189,674 A | 2/1980 | Lathlaen | |
| 4,210,865 A | 7/1980 | Nikolaev | |
| 4,401,986 A | 8/1983 | Trenkler | |
| 4,560,930 A | 12/1985 | Kouno | |
| 4,584,577 A | 4/1986 | Temple | |
| 4,638,250 A | 1/1987 | Shen-Orr | |
| 4,958,607 A | 9/1990 | Lundberg | |
| 5,117,319 A | 5/1992 | Tokunaga | |

(Continued)

FOREIGN PATENT DOCUMENTS

EP    0986731    3/2000

(Continued)

OTHER PUBLICATIONS

PCT Search Report, PCT/IB2006/000829, mailed Sep. 12, 2006.

*Primary Examiner*—Jay M Patidar
(74) *Attorney, Agent, or Firm*—Gifford, Krass, Sprinkle, Anderson & Citkowski, P.C.

(57) ABSTRACT

An apparatus and a method for providing an output signal correlated with a part position for a moveable part over a positional range, the apparatus includes a transmitter coil, the transmitter coil producing an electromagnetic field when excited by an exciter signal; a receiver coil located proximate to the transmitter coil, the receiver coil generating a receiver signal when the transmitter coil is excited due to inductive coupling between the transmitter coil and the receiver coil, the receiver signal being sensitive to the part position; a reference coil, providing a reference signal substantially independent of the part position; a signal conditioner receiving the receiver signal and the reference signal, the signal conditioner including an analog divider generating a ratio signal from the receiver signal and the reference signal, the output signal being obtained from the ratio signal.

19 Claims, 8 Drawing Sheets

U.S. PATENT DOCUMENTS

| | | | |
|---|---|---|---|
| 5,563,922 | A | 10/1996 | Beltz |
| 5,592,082 | A | 1/1997 | Kuriyama |
| 5,972,420 | A | 10/1999 | Saito |
| 6,018,318 | A | 1/2000 | Schodlbauer |
| 6,112,402 | A | 9/2000 | Saito |
| 6,153,062 | A | 11/2000 | Saito |
| 6,166,535 | A | 12/2000 | Irle |
| 6,201,465 | B1 | 3/2001 | Saito |
| 6,236,199 | B1 | 5/2001 | Irle |
| 6,255,810 | B1 | 7/2001 | Irle |
| 6,304,076 | B1 | 10/2001 | Madni |
| 6,329,813 | B1 | 12/2001 | Andermo |
| 6,341,426 | B1 | 1/2002 | Okumura |
| 6,366,078 | B1 | 4/2002 | Irle |
| 6,369,564 | B1 | 4/2002 | Khalfin |
| 6,384,597 | B1 | 5/2002 | Irle |
| 6,384,598 | B1 | 5/2002 | Hobein |
| 6,400,139 | B1 | 6/2002 | Khalfin |
| 6,404,186 | B1 | 6/2002 | Schodlbauer |
| 6,412,364 | B1 | 7/2002 | Berglar |
| 6,443,020 | B1 | 9/2002 | Lin |
| 6,466,889 | B1 | 10/2002 | Schodlbauer |
| 6,467,338 | B1 | 10/2002 | Irle |
| 6,483,295 | B2 | 11/2002 | Irle |
| 6,496,338 | B2 | 12/2002 | Hasegawa |
| 6,518,749 | B1 | 2/2003 | Oudet |
| 6,520,031 | B2 | 2/2003 | Mandni |
| 6,522,128 | B1 | 2/2003 | Ely |
| 6,531,866 | B2 | 3/2003 | Miyata |
| 6,534,970 | B1 | 3/2003 | Ely |
| 6,541,960 | B2 | 4/2003 | Nekado |
| 6,549,004 | B1 | 4/2003 | Prigge |
| 6,552,533 | B2 | 4/2003 | Schodlbauer |
| 6,584,428 | B1 | 6/2003 | Irle |
| 6,593,734 | B1 | 7/2003 | Gandel |
| 6,611,790 | B1 | 8/2003 | Reichl |
| 6,615,155 | B2 | 9/2003 | Gilboa |
| 6,622,589 | B1 | 9/2003 | Pino |
| 7,191,759 | B2 * | 3/2007 | Lee .......................... 123/399 |
| 2001/0005133 | A1 | 6/2001 | Madni |
| 2002/0040531 | A1 | 4/2002 | Schodlbauer |
| 2002/0171417 | A1 | 11/2002 | Schodlbauer |
| 2003/0137294 | A1 | 7/2003 | Gleixner |
| 2003/0151402 | A1 | 8/2003 | Kindler |
| 2004/0216550 | A1 | 11/2004 | Fallak |

FOREIGN PATENT DOCUMENTS

| | | |
|---|---|---|
| GB | 2352522 | 1/2001 |
| WO | WO 98/55828 | 12/1998 |
| WO | WO 00/52425 | 9/2000 |

* cited by examiner

SIGNAL CONDITIONING SYSTEM FOR INDUCTIVE POSITION SENSOR

REFERENCE TO RELATED APPLICATIONS

This application claims priority from U.S. Provisional Patent Application Ser. No. 60/669,478, filed Apr. 8, 2005, the entire content of which is incorporated herein by reference.

FIELD OF THE INVENTION

This invention relates to a signal conditioning system for an inductive sensor, such as a non-contacting inductive sensor for measuring the position of a movable part, such as the rotational position of a pivoting part such as a vehicle throttle pedal.

BACKGROUND OF THE INVENTION

Position sensors are widely used in a variety of applications. For example, motorized vehicles, such as automobiles, are provided with a user-operated control that controls engine speed. Typically, the user-operated control comprises a pedal arm having a foot pedal at a lower end of the pedal arm, typically referred to as an accelerator pedal. An accelerator pedal provides a throttle control signal that is transmitted from the accelerator pedal to an engine throttle control associated with the engine. Conventionally, there is a mechanical connection between accelerator pedal and the engine throttle control, and the throttle control signal is a mechanical signal. However, there has been a recent trend towards electronically controlled throttle control systems, sometimes termed fly-by-wire systems, in which the accelerator pedal or other user operated control is in electrical communication with the engine throttle control, the throttle control signal being an electronic signal. In this and other applications the output signal of any sensor system will often be expected to meet certain specifications. Hence, there is a demand for a signal conditioner that accepts signals from a position sensor, such as an inductive position sensor, and provides an output signal having desired characteristics.

SUMMARY OF THE INVENTION

An inductive position sensor includes a transmitter coil powered by an AC source to produce an electromagnetic carrier flux. A receiver coil receives the carrier flux, and generates a receiver signal. The receiver signal varies with the position of a coupler element (such as a rotor) supported parallel to and closely adjacent to the transmitter coil and receiver coil. The coupler element moves with the part whose position is to be measured.

In a preferred embodiment of the invention, an inductive position sensor includes a third coil, a reference coil that generates a reference signal due to the carrier flux, but is wound to be unaffected by the position to be measured of the coupler element. For a rotational sensor, the reference signal is substantially unaffected by the angular orientation of the coupler element, but does vary with the gap spacing between the coupler and the reference coil. This variation is useful to compensate the output signal for variations in assembly parameters such as the gap. Preferably, the reference coil has a differential structure, so that, in the absence of the coupler element, induced voltages within different portions of the coil cancel out and the reference signal is close to zero. In certain cases, the reference signal is not necessarily zero when the coupler is removed in order to better compensate for variations in the gap between the coils and the coupler element. The receiver coil may also have a differential structure, so that there is no receiver signal in the absence of the coupler element. However, when the coupler element is present, the receiver signal is highly sensitive to the position of the coupler element.

A signal conditioner for an inductive position sensor includes an analog division stage and circuitry for addition of a prestored value to the output signal to bring it into accord with a required specification. A comparator circuit compares the output signal voltage with stored upper and lower plateau values and outputs the signal voltage when it is between the plateau values, and the upper and lower plateau values when the signal reaches these values.

An apparatus, such as an inductive coupling position sensor, for providing an output signal correlated with a part position for a moveable part over a positional range comprises a transmitter coil generating an electromagnetic field when excited by an exciter signal, and a receiver coil located proximate to the transmitter coil, the receiver coil generating a receiver signal when the transmitter coil is excited due to inductive coupling between the transmitter coil and the receiver coil, the receiver signal being correlated with the part position. Preferably, a reference coil provides a reference signal substantially independent of the part position. The receiver signal and the reference signal are passed to a signal conditioner, which includes an analog divider for generating a ratio signal from the receiver signal and the reference signal. The output signal is obtained from the ratio signal, and may have a substantially linear dependence on the part position over the positional range of the apparatus. The plateau (or clamp) voltages, and also the gain curve (the slope of the signal curve versus position (angle or distance), may be set by trimmable resistors.

The part position may an angle of rotation, such as the pivot angle of a pedal assembly for use in an automobile electronic throttle assembly. A coupler element is used to modify the inductive coupling between the transmitter coil and the receiver coil. The signal conditioner may further include a voltage clamp so that the output signal has a lower plateau voltage and an upper plateau voltage. The signal conditioner may further including a logic circuit, for example including a non-volatile (long term) memory, such as a zener array, for storing a calibration adjustment. The calibration adjustment may be a voltage adjustment added to the output signal. The voltage adjustment is stored in a non-volatile memory, and a virtual ground level adjuster in communication with the non-volatile memory is used to adjust the output signal. The receiver coil, the reference coil, the transmitter coil, and the signal conditioner may all be supported by a single printed circuit board.

BRIEF DESCRIPTION OF THE DRAWINGS

The description makes reference to the accompanying drawings in which.

DETAILED DESCRIPTION OF THE INVENTION

A signal conditioner according to embodiments of the present invention receives a receiver signal and a reference signal, and uses them to provide a linear output signal proportional to the position of the part to be measured. For an automotive application, such as an electronic throttle, the output can be adjusted to conform to the standard set for the vehicle, and is substantially unaffected by production variations in the gap between the coupler element and the coil assembly or other common mode signals. It is desirable that the signal conditioner be as simple as possible so as to be low in cost and highly reliable in operation, and avoid the use of expensive components.

A signal conditioner preferably includes an excitation source for the transmitter coil, for example a Colpitts oscillator for which the transmitter coil is the inductive component. The signal conditioner receives at least one receiver signal and a reference signal, and amplifies each signal. The signals may each be multiplied by the excitation voltage in order to facilitate signal detection. The outputs of each of the multipliers are then low pass filtered and then the two outputs are divided to effectively correct the output of the receiver coil for the common mode variations detected by the reference coil.

The reference signal is used to correct the receiver signal for common mode effects, such as variations in the gap between the coupler element and a coil assembly. The transmitter coil, receiver coil, and reference coil may all be supported together as a coil assembly a common substrate, such as a printed circuit board. The circuit board is then located proximate to the coupler element, which is mechanically coupled to a part whose position is to be determined. The separation between the coil assembly and the coupler element inherently varies during production, and this separation can readily be corrected using a reference coil having a differential structure. The reference coil can also used to correct for common mode signals such as stray induced voltages, temperature, and transmitter power variations.

In a rotational position sensor, the receiver coil may alternatively be called a rotational modulator, as the receiver signal varies with rotational position of the coupler element. The reference coil, if it has a differential structure, may be called an axial modulator, as the reference signal varies then with axial separation of a coil assembly and coupler element, but not the rotational position of the coupler element. The transmitter coil may alternatively be called an exciter coil.

In a preferred embodiment, the outputs of the receiver coil and reference coil are both rectified (amplified and then detected) by multiplication with the reference signal, or alternatively rectified using the exciter signal e.g. from the Colpitts oscillator. The detected outputs are each passed through low pass filters and then fed to an analog divider. The divider essentially corrects the rotational modulator signal for variations in the gap between the rotor, which effectively couples the carrier signals to the rotational modulator and the axial modulator, and is supported in parallel relationship to and in close proximity to the substrate carrying the other coils. Variations in the gap between the rotor and the coils, which necessarily occur in a production operation, are normalized by the analog divider as are common mode variations such as random induced signals, variations in the power supply voltage, and the like.

An analog voltage can then added to the ratio-metric signal to shift the sensor output signal into conformity with a desired signal specification, for example as required by other automotive electronics in the case of an electronic throttle sensor. This analog voltage is generated during an initial calibration process and may be stored in digital form in zener diode array (acting as a static RAM) or normal static RAM, and can be converted into analog form for addition to the original signal. The output signal is then adjusted by a differential amplifier using the stored voltage adjustment. The signal then is provided to a voltage clamp, which clamps the upper and lower limits of the signal by comparing the signal with stored values for the upper and lower plateau values.

The output voltage range can hence be clamped to upper and lower plateau values. Trim is used to adjust the gain slope to a desired value, using trim resistors. Laser trimming of resistors can be used, for example by burning off carbon strips, or traditional rotating wiper variable resistors may also be used in some applications. In an automotive electronic throttle control application, this trim step can be carried out once, during factory calibration. This can be very effective where ratiometric sensing is used.

An example calibration process includes detecting an initial signal voltage, converting it into digital form using an analog-to-digital converter, and converting the voltages of the upper and lower plateau values which are then stored in a zener diode array (acting as a static RAM) or normal static RAM. A circuit then compares the difference between the lower plateau and the initial signal voltage through a logic support circuit and stores the value in the static RAM. During normal operation, a multiplexer comprising a pair of comparators detects the raw signal voltage and compares it with the upper and lower plateaus so that the output signal either comprises the raw signal, the upper plateau to the extent that the raw signal exceeds the upper plateau, or the lower plateau to the extent that the raw signal is below the lower plateau. Hence, the output signal is clamped between the upper and lower plateau values. Trimmable resistors may be provided to control output gain, and to defining upper and lower plateau values.

A signal conditioner according to the present invention thus avoids the need for the use of a microprocessor of the type employed in a conventional system. For example, in conventional electronic throttle applications, a microprocessor is used for converting the raw signal into one compatible with the engine system. The microprocessor adds expense, complexity and associated failure modes, and processing delays. However, in embodiments of the present invention, a low cost analog-to-digital converter (low resolution, such as 8 bits or less), and non-volatile memory (such as static RAM, in some examples a few bytes or less are needed) are used.

The signal conditioner can be implemented in an ASIC chip, without the need for a processor, RAM, analog-to-digital (A/D) converter, or a temperature compensation circuit. For example, a conventional signal processor may attempt to correct for temperature variations using a look-up table. However, this is complex and prone to error. Further, conventional systems, no matter how well initially calibrated, fail to account for geometrical changes due to mechanical wear. For example, pivot looseness is a serious problem for conventional electronic throttle applications of inductive sensors. However, systems according to the present invention automatically compensate for geometrical changes such as pivot looseness. For an electronic throttle application, excellent signal reproducibility was obtained for temperatures over the range −40° C. to 80° C., gap variations (between a coil assembly and coupler element) of over 1 mm, and pivot drop variations of over 1 mm. For some applications, a number of independent coils and/or associated signal conditioners may be provided for redundancy and safe operation.

Figure 1A:
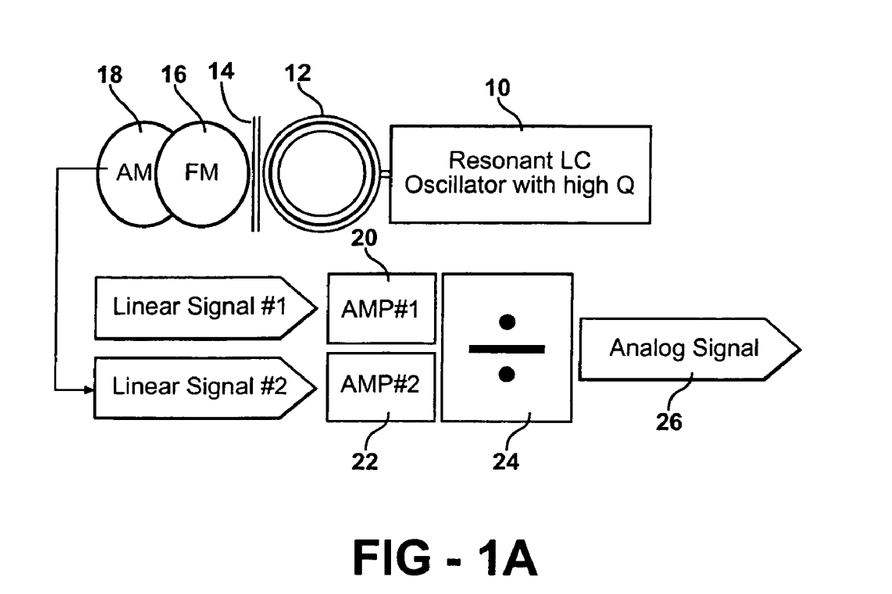
FIG. 1A is a simplified block diagram of signal conditioning system.

FIG. 1 shows a block diagram of a sensor system comprising an oscillator 10, transmitter coil 12, coupler element 14 (not shown in detail), receiver coil 16, and reference coil 18. For a rotation sensor, the receiver coil provides a receiver signal that is sensitive to the angular position of the coupler element. Similar arrangements are described in more detail in our co-pending applications. The reference coil provides a reference signal that is substantially unaffected by the angular position of the coupler element. The receiver signal and reference signal are amplified by first and second amplifiers (20 and 22 respectively), and the receiver signal is then divided by the reference signal in analog divider 24. The output 26 is an analog signal. The signal conditioner accepts two signals (the receiver signal and the reference signal) and divides them to obtain a ratio (or ratiometric) signal. This ratio signal may then be multiplied by the supply voltage, to obtain an output signal independent of the supply voltage. The receiver signal is proportional to the angle of the coupler element over a certain angular range, determined by the coil configuration, while the reference signal is substantially constant over the angle of travel of the coupler element. However, both signals are commonly sensitive to common mode effects like electromagnetic interference (EMI), temperature, and (in some configurations), to mechanical tolerances such as the gap between the coupler element and a coil assembly. Signal processing by an analog circuit to obtain the ratio signal avoids the delay of digital processing, which would also require an analog to digital conversion.

In a preferred embodiment, the receiver and reference coils are formed by printed circuit techniques on the same substrate, along with the transmitter coil. The transmitter coil is energized by an alternating current, and may for example form part a Colpitts oscillator circuit which generates a sinusoidal voltage, which circuit can be formed as part of the signal conditioning apparatus.

Inductive sensors have good immunity to static electric or magnetic fields, but are generally viewed as vulnerable to the beating phenomenon. Beating occurs between similar frequencies, e.g. between the transmitter and sensor oscillator circuits, and a results in sum and difference frequencies. A low frequency difference frequency is relatively difficult to filter out. One approach is to use the natural tendency of two oscillators to achieve the same frequency, an adaptive mechanism known as Huygen's clock phenomenon or lock-in synchronization. However, adaptation of resonant frequency requires a low Q-factor resonator. Beating is a common mode signal for both the receiver coil and the reference coil, and the ratiometric approach of the present invention allows any common frequency components in the receiver signals and reference signals to be factored out. Hence, there is no upper limit on the oscillator Q-factor, enhancing efficiency and leading to low noise system operation. The Q-factor may be approximately 30 or higher, compared with approximately 20 for conventional systems.

The system conditioner is low noise. Pure analog processing may be used, considerably reducing EMC compared to digital processing. The inductive sensor may be provided with at least one passive parallel tank, resonant at frequencies within the range of any appropriate radiation immunity test. An example sensing coil has a resonance frequency between 20 MHz and 200 MHz, while a radiation immunity test sweeps from 150 K to 1 GHz. The sensor may have a built in LPF and the resonance frequencies of the receiver and reference coils matched.

Figure 1B:
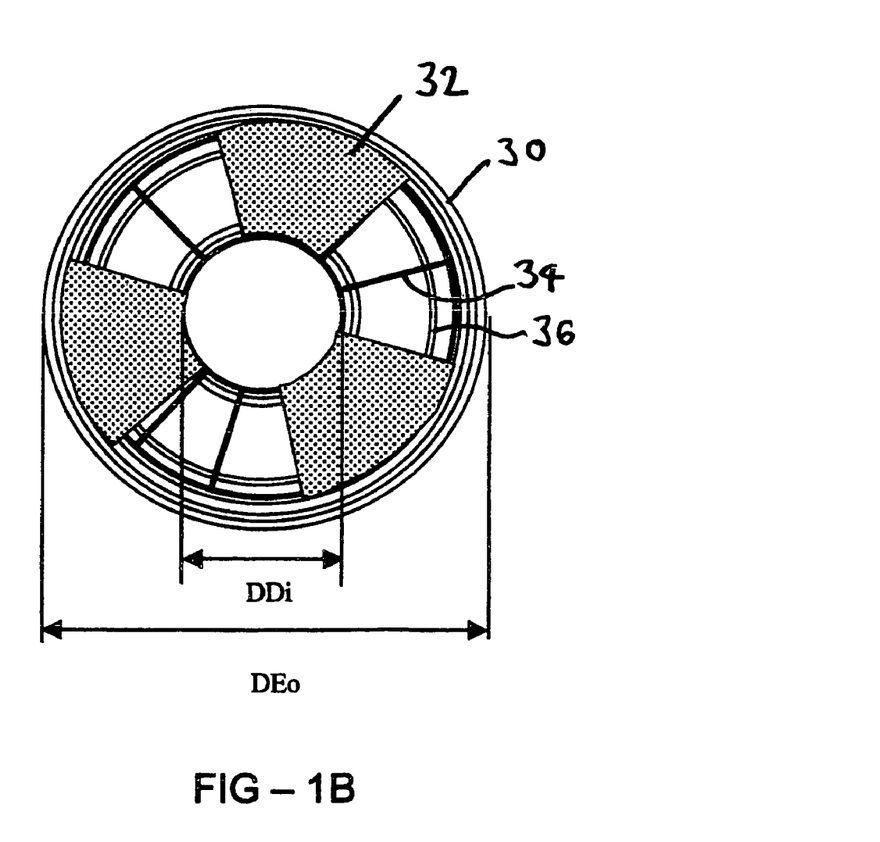
FIG. 1B is a simplified schematic of a coil assembly.

FIG. 1B is a simplified diagram of an example arrangement, comprising a transmitter coil (the outer rings 30), receiver coil 34 (a lobed wheel-like structure shown at 34), reference coil (outer diameter shown at 36), and coupler element 32 (comprising three electrically conductive plates, in this view located in front of the coil assembly). Rotation of the coupler element modifies the inductive coupling between the transmitter coil and lobes of the receiver coil. The receiver coil is preferably configured to produce no signal in the absence of the coupler element, due to self-cancellation of various induced potentials. As described more fully in our copending applications, the receiver coil can be configured so that potentials induced in adjacent lobes are opposed. In a particular example, the receiver coil includes first and second loop structures configured so as to tend to cancel each other's induced potential. Each loop structure has circumferential segments at the outer diameter alternating with circumferential segments at the inner diameter, the structure 34 shown in FIG. 1B corresponding to an overlay of the two loop structures. Coil connections are not shown for clarity. Here, DDi is the inside diameter of the reference coil (differential dummy), and DEo is the outside diameter of the transmitter coil (or exciter coil).

Figure 2:
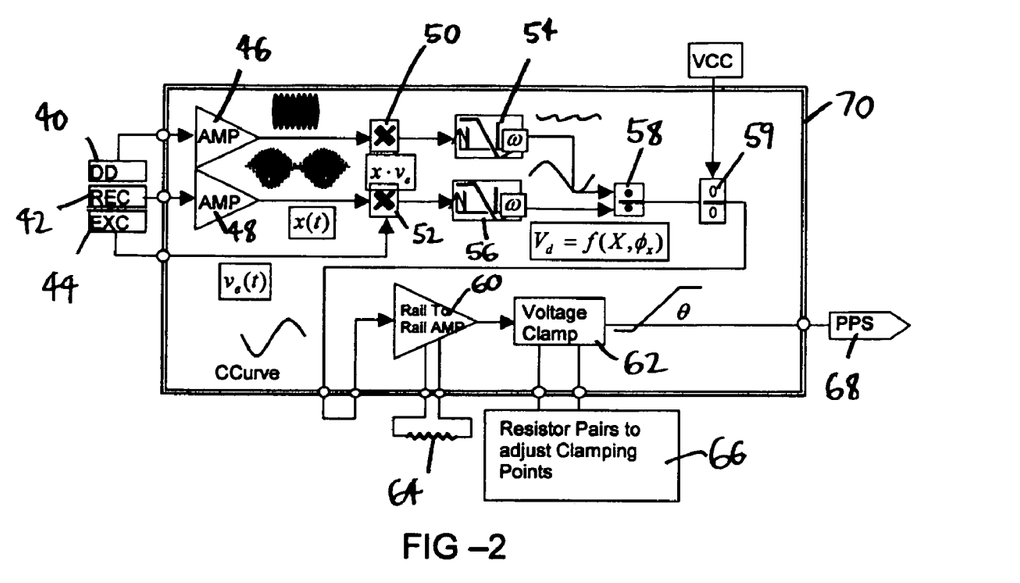
FIG. 2 is a block diagram of an analog signal conditioner.

FIG. 2 shows a simplified block diagram of a unified analog architecture. The system comprises a reference coil 40 (in this case, differential dummy DD) providing a reference signal, receiver coil 42 providing a receiver signal, transmitter coil (or exciter) 46 energized by an exciter signal, first and second amplifiers 46 and 48, first and second multipliers 50 and 52, low pass filters 54 and 56, analog divider 58, signal degenerator 69, rail to rail amplifier 60 and voltage clamp 62. These components, except the coils, may be included in an analog ASIC, shown as box 70. External resistors 64 and 66 are used to adjust gain and clamping points respectively, and the output signal is obtained at 68. The output signal is correlated with the position of a moveable part, so that the signal conditioner acts as a part position sensor (PPS). A specific application is a pedal position sensor for an automobile.

In operation, the reference signal is amplified by the first amplifier, multiplied by the exciter signal, and low-pass filtered. The receiver signal is amplified by the second amplifier, also multiplied by the exciter signal, and low pass filtered. The divider 58 receives the amplified, multiplied, and filtered signal and gives a ratio-metric signal. The ratio-metric signal is passed through (optional) signal degenerator 59, which multiplies the ratio signal by the supply voltage. The ratio-metric signal then passes through amplifier 60, and external resistors 60 are adjusted for the desired gain. The ratio-metric signal then passes through the voltage clamp 62, which prevents the output signal from going above an upper plateau value, or falling below a lower plateau value. The plateau values can be adjusted using resistor pairs 66. In this example, the analog circuitry is included into an analog ASIC (70), and the resistors 64 and 66 are external to the ASIC, so that adjustments of gain and plateau voltages are easily achieved. The signal degenerator is optional, and was included in order to track the supply voltage. This leads an output signal dependence on the supply voltage, but allows traceability of the supply voltage if needed.

The waveforms shown between the low pass filter and the divider are possible position-dependent signals from the receiver and the reference coils. The receiver signal typically has a reasonably linear portion. The clamping point settings preferably bracket a linear region of the receiver signal. The reference signal is substantially independent of position. The ratio signal is sometimes called a characteristic curve (Ccurve).

For some applications, an output independent of supply voltage variations is required, and the signal degenerator 59 is used. The signal degenerator may be an analog divider, multiplier, analog switch, or other device. For example, by dividing the signal from the analog divider by the supply voltage, a ratio signal independent of the supply voltage is obtained.

Figure 3:
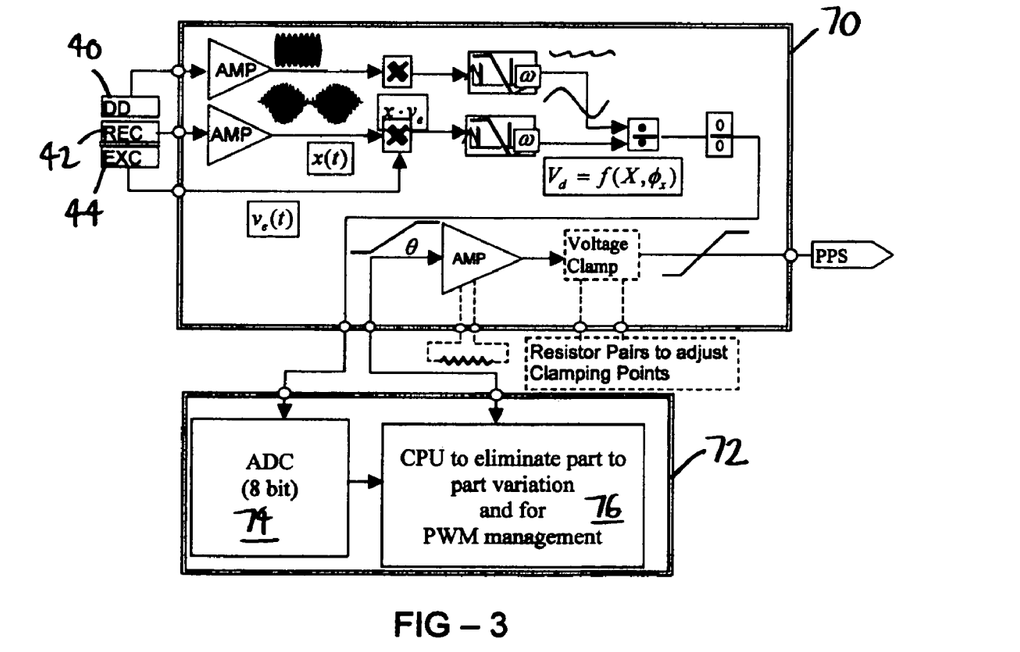
FIG. 3 is a block diagram of a signal conditioner with analog division.

FIG. 3 shows an alternative configuration, including the three coils (40, 42, 44) and the circuit 70 as described above in relation to FIG. 2. In this configuration, the ratio signal is passed from the analog ASIC 70 to a digital circuit 72, which can be implemented as a digital ASIC. The digital circuit 72 includes an analog-to-digital converter (ADC) 74 and processor 76. For an electronic throttle application, the ADC may only need 8 bits if gain adjustment is made in the analog circuit. The processor 76 is used to eliminate part-to-part variation, and for PWM management. In this example, digital processing replaces the voltage clamp.

Figure 4A:
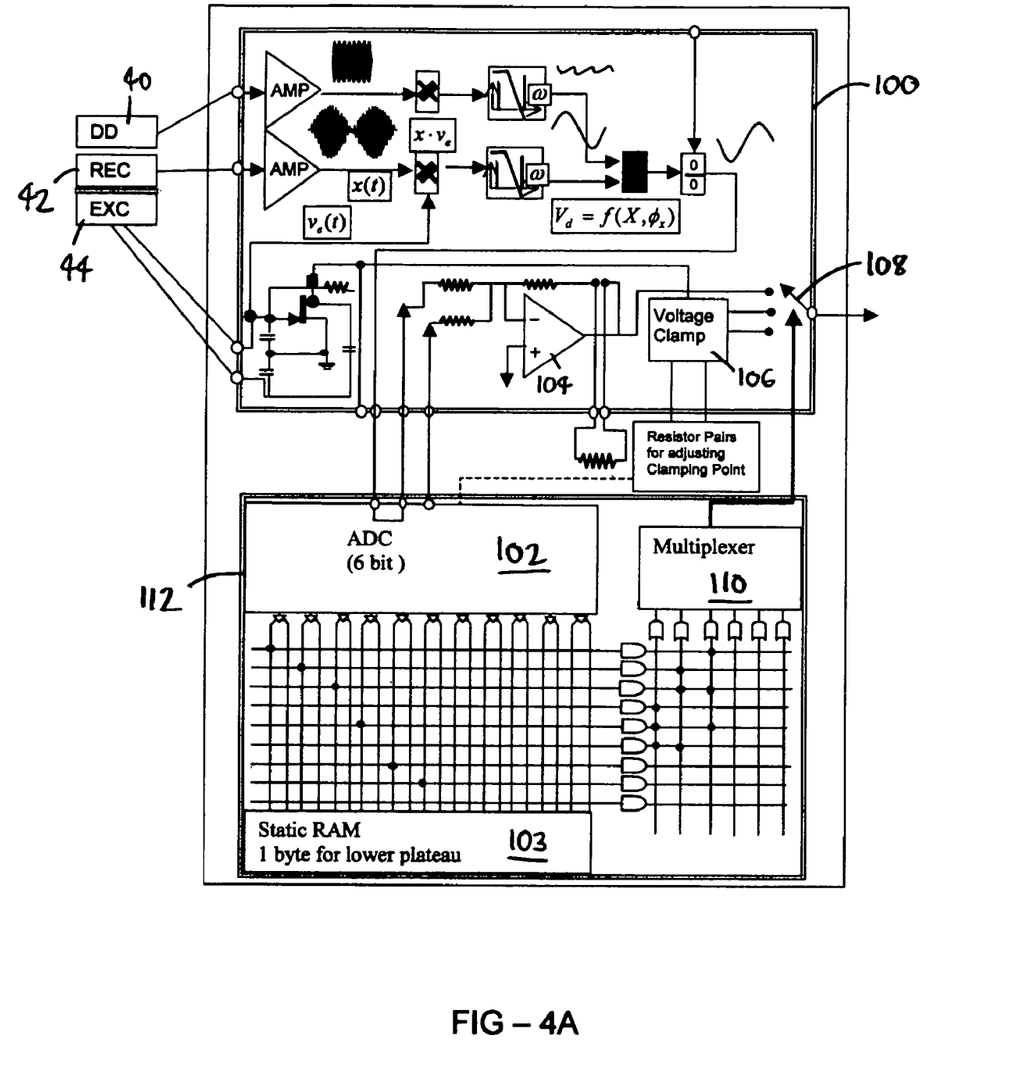
FIGS. 4A and 4B are block diagram of a signal conditioner with analog division and logic support.

FIG. 4A shows a block diagram for a signal conditioner with minimal logic support. The analog ASIC (100) is similar to that described in relation to FIG. 2, and the analog division process will not be described in detail again here. As discussed in relation to FIG. 2, the output of the analog divider is passed through the signal degenerator, which multiplies the ratio signal be the supply voltage to remove the effect of supply voltage variations on the ratio signal.

In this example, this ratio signal is fed to a logic support circuit 112, comprising the analog-to-digital converter 102, static RAM 103, and multiplexer 110. For an electronic throttle application, the ADC (102) can be six bits. However, other resolutions can be used. The analog-to-digital converter receives a voltage stored in the static RAM (103), and this stored voltage is added to the output of the analog divider (the ratio signal). The lower plateau voltage stored in the static RAM is developed during a calibration procedure, which is described in more detail below, to bring the output signal into a desired form. In the case of an electronic throttle, the stored lower plateau voltage in the static RAM is used to adjust the output signal into the form required by subsequent automotive electronics. One byte may be allocated in the static RAM for the initial signal, measured at the nominal zero position before adjustment.

The voltage-shifted ratio signal is then passed through the rail-to-rail amplifier 104, which has its inputs adjusted by a voltage divider employing a pair of variable resistors which are adjusted during calibration and operate to establish the upper and lower plateau values of the signal. The voltage clamp 106 compares the instantaneous signal with the upper and lower plateau values, and when the signal goes above the upper plateau value, the switch 108, connected to multiplexer 110, switches on the stored plateau voltage as the output signal. Similarly, when the sensor voltage drops below the lower plateau, the signal conditioner outputs the lower plateau voltage. Otherwise, the output signal is correlated with the ratio signal.

Voltages stored in the static RAM are developed during a calibration process, which involves detecting the initial signal voltage and then converting it to digital form in the analog-to-digital converter. Also, the upper and lower plateau voltages are converted into digital form through the analog-to-digital converter, and stored in the static RAM. Next, the difference between the lower plateau value and the initial signal voltage is compared and converted into an analog voltage. This analog voltage is stored so that it may be added to the sensor signal through the rail-to-rail amplifier.

The initial value and lower plateau detecting circuit need not be part of the signal conditioning electronics but may be part of installation equipment used at initialization. Similarly, an external analog-to-digital/digital analog converter may be part of the installation equipment and not travel with the vehicle.

Figure 4B:
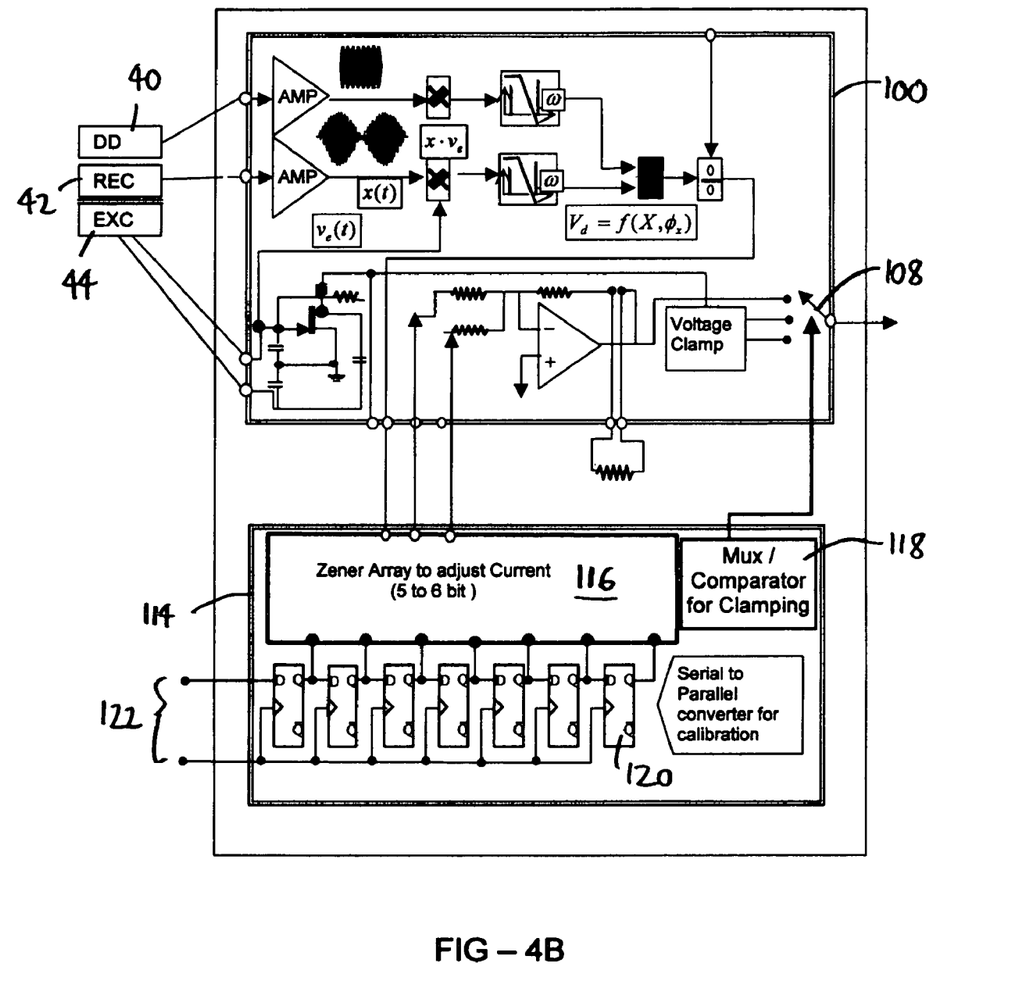

FIG. 4B shows another block diagram for a signal conditioner with minimal logic support. In this configuration, the logic support circuit 114 comprises a zener array to adjust the ratio signal, multiplexer 118, and serial to parallel converter (120) for calibration.

The use of a serial-to-parallel converter allows calibration data to be entered through a single pin (122). Other data storage approaches can be used in place of the zener array used to adjust the virtual ground. A separate logic support circuit may be used with an analog circuit (such as an analog ASIC) for the signal conditioner. However, logic circuits such as a serial to parallel converter and a zener array may be combined with the analog circuit in single ASIC.

Figure 5:
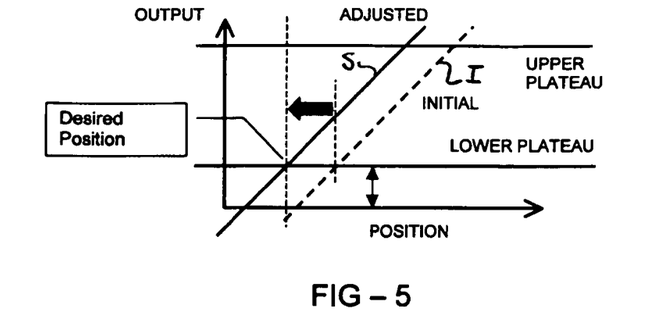
FIG. 5 is a graph showing offset of the output voltage due to addition of stored voltage from static RAM.

FIG. 5 is a graph illustrating an initial output voltage (labeled I), and the shifted (or adjusted) output voltage (labeled S), as a function of position. In this example, the shifted signal is higher than the initial output signal, due to addition of the stored voltage. The stored voltage increases the output voltage so that the intersection of the output voltage and lower plateau value is at a desired position. For an electronic throttle application, this intersection may occur after a small fraction of pedal travel. As the throttle pedal is depressed, the output of the signal conditioner remains at the lower plateau voltage for a small amount of pedal travel called the idle plateau, and then the output voltage increases linearly with pedal pivot angle until the output voltage reaches the upper plateau voltage. The output voltage is then clamped to the upper plateau voltage, and cannot exceed this value regardless of the ratio signal generated by analog division.

Hence, a stored constant voltage is added to the output voltage to obtain a desired slope position, and this also adjusts the idle plateau length. The idle position can be adjusted, corresponding to an adjustment of the lower plateau voltage using a virtual ground adjustment. For example, the virtual ground may be approximately 2.5 V in relation to the chassis ground, for an approximately 0-5 V voltage output range. Calibration can be achieved using switchable resistors within an ASIC on the circuit board, and need only be done once during initial construction of the sensor.

Figure 6:
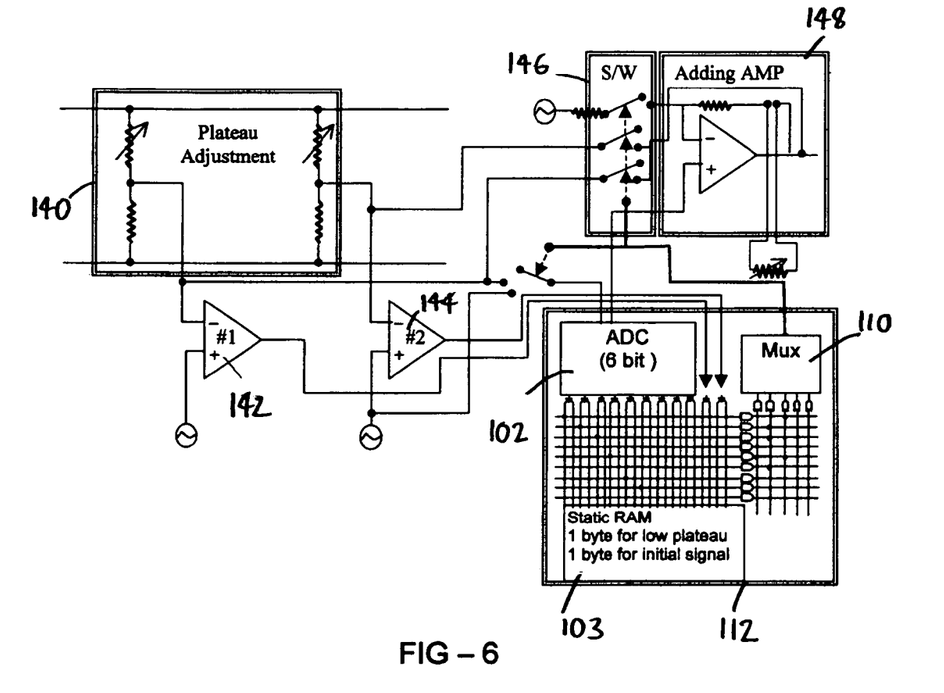
FIG. 6 is a schematic diagram of the circuitry for voltage shifting and clamping the output signal to bring it into conformity with desired characteristics.

FIG. 6 shows a block diagram of logic circuitry for shifting and clamping the output signal. The figure shows resistor pairs for adjustment of the clamping pairs, shown in box 140, first and second comparators (142 and 144) which receive the ratio signal from analog division, the ADC and static RAM (as discussed above in relation to FIG. 5), a switching circuit 146, and an adding amplifier 148 (an analog adder). The second input to each comparator comprises a voltage divider including a resistor pair with one variable resistor which is adjusted during calibration. The static RAM stores one byte for the lower plateau signal and one byte for the initial signal. These values are added to the initial signal to develop the output signal for the circuitry. The reference voltage of the analog-to-digital converter and lower plateau voltage are known and may be preprogrammed, i.e. hardwired into the circuitry. Only the initial signal value needs to be assigned to static RAM. The logic support circuit 114, discussed in relation to FIG. 4B, can be used in place of the logic support circuit 112 shown here.

An example calibration process is as follows. The initial signal voltage from analog division is determined, and converted to digital form using an analog-to-digital converter (ADC). The upper and lower plateau voltages are also converted to digital by the ADC, and stored in static RAM. A logic support circuit, such as an electronic device having a processor, is used to compare the difference between the lower plateau voltage and the initial signal voltage (for example, for no pedal movement, or with the coupler element removed). The difference voltage, calculated as a digital value, is converted to an analog voltage and added to the signal voltage using an adding amplifier.

The logic process followed during operation is as follows, with reference to FIG. 6). If the first comparator (142) is off and the second comparator (144) on, the output voltage follows the ratio signal, i.e. the initial signal voltage is used as the output. If both comparators are on, the lower plateau voltage is taken as the output. If the second comparator is on, and the first comparator is odd, the upper plateau voltage is taken as the output. Other logic cases may generate an error code. In an automobile application, error codes may trigger a vehicle to enter a limp-home mode.

Figure 7:
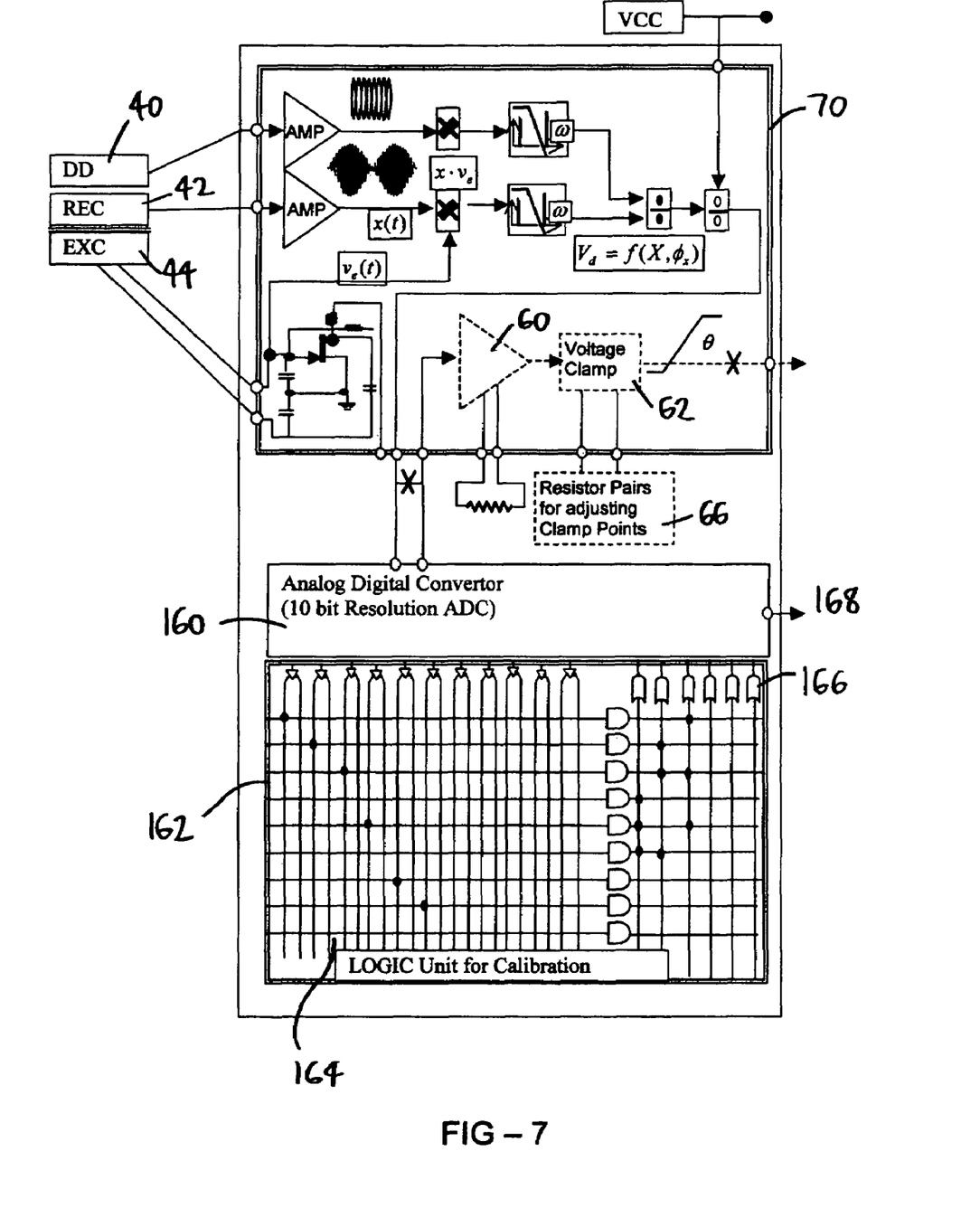
FIGS. 7 and 8 show other configurations with logic support.

FIG. 7 shows another configuration with logic support. The system comprises coils 40, 42, and 44, analog ASIC 70 (this schematic shows the Colpitts oscillator for the transmitter coil, and its function is more fully described above in relation to FIG. 2). The system further includes a logic support circuit 162, with static RAM 164 and multiplexer 166, and analog-to-digital converter (ADC) 160. For an electronic throttle, in this configuration the ADC preferably has 10 bit resolution. The logic support circuit can be used to determine one or more of the following parameters: the plateau voltages, the stored voltage to adjust the output voltage, and the gain slope. The logic support need not be a full CPU configuration, in that registers and bus controllers are not needed. In this configuration, the rail-to-rail amplifier 60 and voltage clamp 62 in the analog ASIC are not used, and the output signal is obtained at 168.

Figure 8:
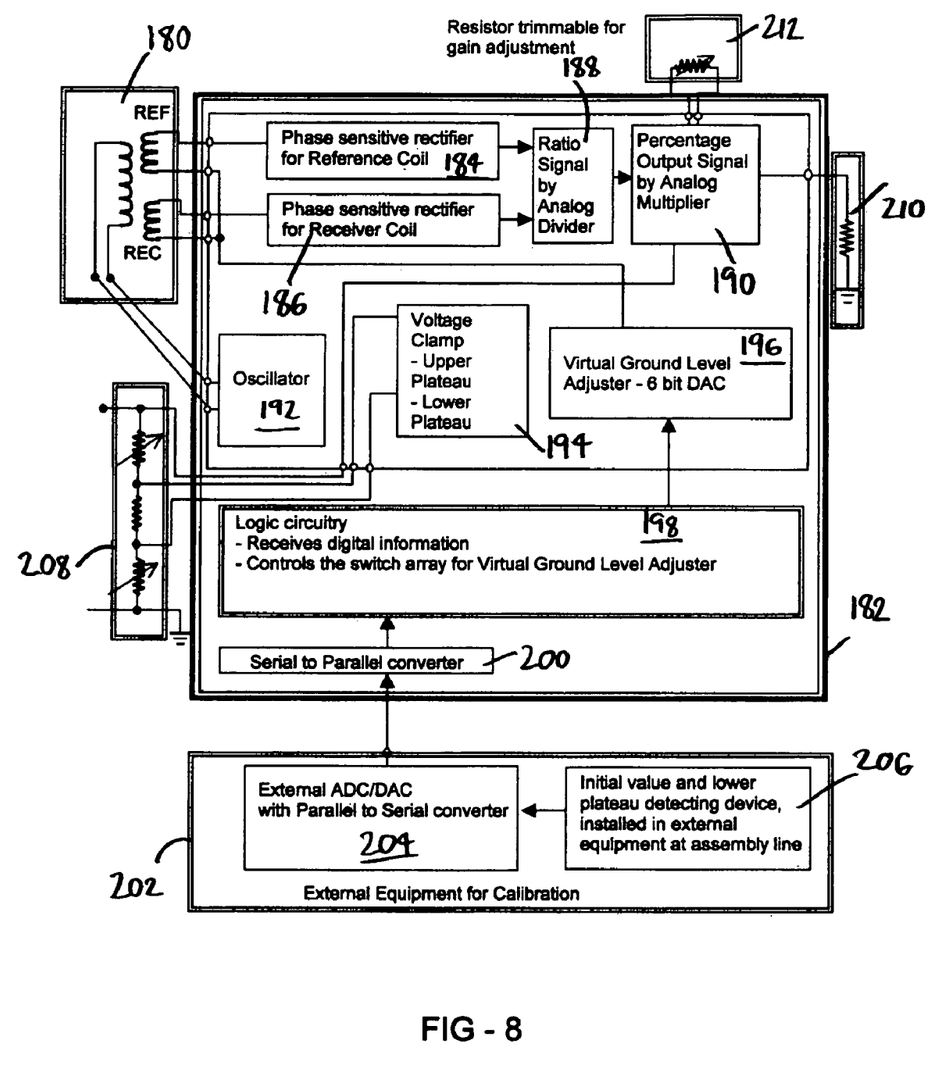

FIG. 8 shows a further signal conditioner configuration with logic support. The figure shows coil assembly 180 (including reference coil, receiver coil, and transmitter coil), and signal conditioner 182 comprising phase sensitive rectifier for the reference coil 184, phase sensitive rectifier for the receiver coil 186, analog divider 188, analog multiplier 190, oscillator 192, voltage clamp 194, virtual ground level adjuster 196, logic circuit 198, serial to parallel converter 200. External equipment 202 is used for calibration, including external ADC/DAC 204 and voltage level detector 205. The initial value and lower plateau values are obtained from the external equipment, stored in the logic circuit 198, and used to adjust the virtual ground and hence the output signal level. Resistors 208 are trimmed to set the clamp and upper plateau levels. The output signal is applied through load 210.

Figure 9:
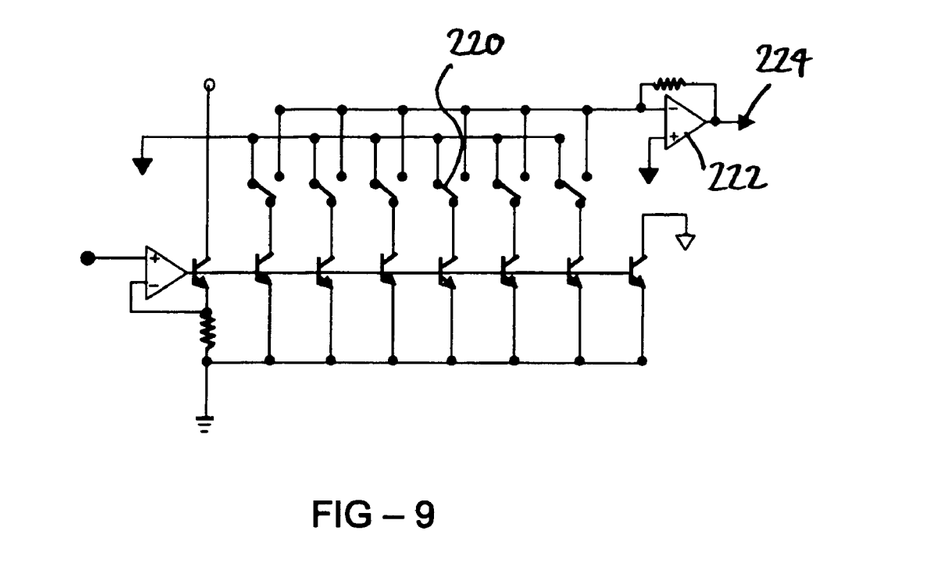
FIG. 9 is a schematic for virtual ground adjustment using Zener switches.

FIG. 9 is a schematic for virtual ground adjustment using zener switches, which produces a controllable voltage source. The circuit includes an array of zener switches (zener array) such as 220. Zener zapping is used to control the voltage output of the final amplifier 222, and this output 224 is used as an adjustable virtual ground. The zener array acts as a static RAM, and the zener array is a preferred data storage circuit for logic support. Other data storage circuits may be used. For storage of calibration data, the data storage is preferably permanent. Embodiments of the present invention can also be used for multi-turn sensors, in which a zener array is useful for storage of one-time calibration data, and temporary data storage is used for intermediate storage, for example to monitor number of rotations, such as counter logic or standard static RAM. Voltage adjustments, such as addition, can be achieved using standard analog circuits, such as an operational amplifier circuit.

Figure 10:
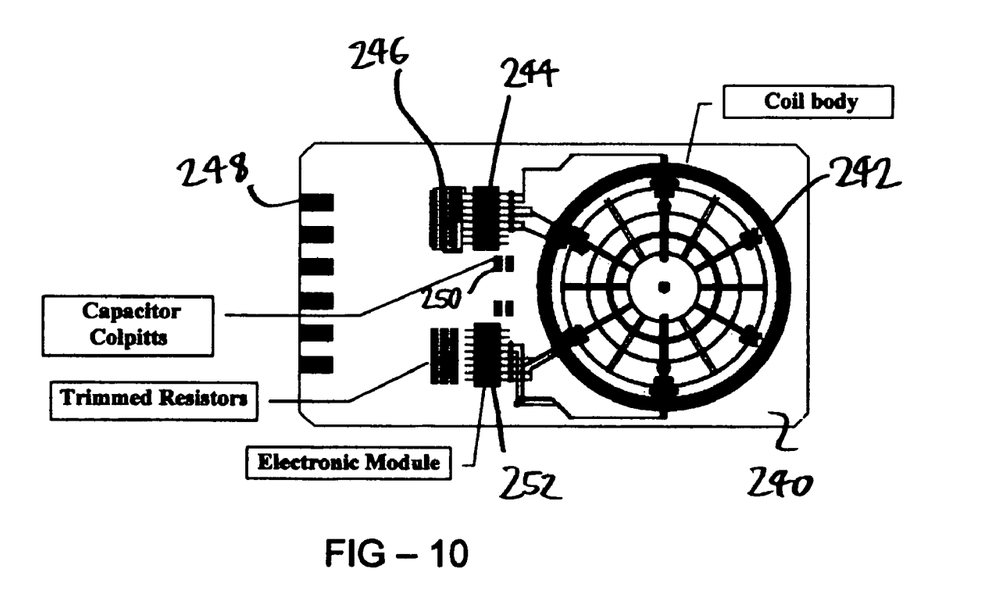
FIG. 10 is a highly simplified layout of an electronic module according to an example of the present invention.

FIG. 10 shows a highly simplified layout of an electronic module according to an example of the present invention. A common substrate 240, in this example a printed circuit board, has the transmitter, receiver, and reference coils printed on it to form the coil body 242. The electronic module 244, such as a signal conditioner according to the present invention, is supported on the substrate, along with external trimmable resistors (246) and a Colpitts capacitor (250). Output is through connectors 248. A second signal conditioner 252 is provided for redundancy, and if the output of both signal conditioners do not agree, an error state arises. For an electronic throttle, a vehicle may enter a limp home mode, or the lower acceleration setting used.

Further Aspects of Signal Conditioning

The output voltage may not be entirely linearly dependent on position. A useable range of linearity can be defined, extrapolating to the virtual ground, which may be a negative voltage relative to the true ground. The ratio signal may be formed as the ratio of (receiver signal+A)/(reference signal+B), where the reference signal and receiver signal refer to DC voltages obtained by, e.g. demodulating and low-pass filtering of the receiver and reference signals, respectively. A and B refer to virtual ground corrections, due to assumed linearity over a slightly non-linear response. The width of the useable linear range may be determined by accuracy specifications. The correction terms A and B are likely to be very similar, and the same value can be used for both A and B.

In examples of the present invention, trimmed resistors are provided, comprising output gain controlling resistors, and lower/upper plateau defining resistor pairs, which could be trimmed to give the inductive sensor a desired output voltage range, for example a voltage varying substantially linearly with rotation angle as the coupler element rotates.

Signal conditioning may include modulation and demodulation steps. In a modulation step, the signal correlated with rotational angle of the coupler element is multiplied by the exciter signal, and demodulation includes the use of a phase sensitive rectifier for the modulated signal. Use of a phase-sensitive circuit can double the linear range of the measured angle. Also, ratiometric position sensing means that the demodulated signal is formed in such a way that the output signal is much less dependent on the exciter voltage.

Examples of the present invention do not require temperature calibration data to be stored in memory, as this common mode factor can be compensated using a reference coil and ratiometric sensing.

The output voltage ranges can be clamped to upper and lower plateau values. Trim is used to adjust the gain slope to a desired value, using trim resistors. Laser trimming of resistors can be used, for example by burning off carbon strips, or traditional rotating wiper variable resistors may also be used in some applications. In an automotive electronic throttle control application, this trim step can be carried out once, during factory adjustments.

Other applications of inductive position sensors include an electronic throttle control, suction pipe valve , braking control, steering, fuel tank level reading, and gear selector shafts.

A method of determining the part position of a moveable part comprises exciting a transmitter coil using an alternating current; obtaining a receiver signal sensitive to the part position from a receiver coil; obtaining a reference signal substantially independent of the part position; analog dividing the receiver signal by the reference signal to obtain a ratio signal; adding a voltage adjustment to the ratio signal to obtain an output signal; and clamping the output signal between upper and lower plateau levels, the part position being determined from the output signal.

Examples of the present invention also include multi-turn sensors, described in more detail in our co-pending application. A multi-turn sensor may comprise a plurality of receiver coils, for example using multi-pole coils with an angular offset to each other. For example, two receiver coils may be used that provide out-of-phase receiver signals, having have different individual positional ranges. Sensors may include an electronic module having an ASIC module for signal conditioning. The electronic module may comprise a printed circuit board supporting coils such as a reference coil, receiver coil, and transmitter coil which produces an electromagnetic field on excitation by an alternating current source. For multi-turn sensing, the virtual ground can be adjusted with the number of turns (or multiples of some rotation angle), while the rotation history of the sensor is managed by a logic stack. The decision of which receiver signal to use is decided by a logic circuit. One of a plurality of receiver coils is selected using a multiplexer when the predetermined signal voltage is reached. Multiturn sensors can be used for speed determination, distance measurements, and the like.

For example, using a 3 pole coupler element, the angular range of a single receiver coil may be approximately 40 degrees. The virtual ground level can be set according to the number of multiples of this angular range. The angular range of the sensor system may be 120 degrees with using three receiver coils and segment management. The rotation history can be stored in memory, for example using stack operation with a linked list data structure. A virtual ground adjuster may used that is similar to that used for adjustment of the plateau voltage.

Embodiments of the present invention include a signal conditioning system for use with a non-contacting inductive sensor for measuring the position of a movable part such as a pivoting throttle pedal in an automotive application, and for generating an electrical signal which is directly proportional to the position of the part for controlling the vehicle, and more particularly to such a signal conditioning system which operates with an inductive sensor. The inductive sensor preferably has at least three windings, comprising an transmitter coil for generating a carrier signal, a receiver coil for detecting the carrier signal as modulated by a coupler element associated with the part whose position is to be measured, and a reference coil which receives the carrier signal but is wound in such a way as to be unaffected by the position of the rotor so as to generate a signal which may be used to correct the rotational modulator signal for variations in the gap between the rotor and the three windings as well as other common mode signals such as power supply fluctuation.

Patents, patent applications, or publications mentioned in this specification are incorporated herein by reference to the same extent as if each individual document was specifically and individually indicated to be incorporated by reference. In particular, U.S. Provisional Patent Application Ser. No. 60/669,145, filed Apr. 7, 2005, is incorporated herein in its entirety.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Having thus disclosed our invention, we claim:

1. An apparatus for providing an output signal correlated with a part position for a moveable part over a positional range, the apparatus comprising:
   a transmitter coil, the transmitter coil producing an electromagnetic field when excited by an exciter signal;
   a receiver coil located proximate to the transmitter coil, the receiver coil generating a receiver signal when the transmitter coil is excited due to inductive coupling between the transmitter coil and the receiver coil, the receiver signal being sensitive to the part position;
   a reference coil, providing a reference signal substantially independent of the part position;
   a signal conditioner receiving the receiver signal and the reference signal, the signal conditioner including an analog divider generating a ratio signal from the receiver signal and the reference signal,
   the output signal being obtained from the ratio signal.

2. The apparatus of claim 1, wherein the ratio signal has a substantially linear dependence on the part position over the positional range.

3. The apparatus of claim 1, wherein the part position is an angle of rotation.

4. The apparatus of claim 1, further comprising a coupler element having a coupler element position correlated with the part position, the inductive coupling between the transmitter coil and the receiver coil being sensitive to the coupler element position.

5. The apparatus of claim 1, the signal conditioner further including a voltage clamp,
   the output signal having a lower plateau voltage and an upper plateau voltage.

6. The apparatus of claim 5, wherein the plateau voltages and the gain curve are set by trimmable resistors.

7. The apparatus of claim 1, the signal conditioner further including a long term memory,
   the long term memory storing a voltage adjustment,
   the output signal being obtained from the ratio signal and the voltage adjustment.

8. The apparatus of claim 7, wherein the voltage adjustment is entered into the long term memory during a calibration process.

9. The apparatus of claim 7, wherein the long term memory is a switch array comprising zener diodes.

10. An apparatus for providing an output signal correlated with a part position for a moveable part over a positional range,
    the apparatus comprising a signal conditioner receiving a receiver signal sensitive to the part position and a reference signal substantially insensitive to the part position, the receiver signal being obtained from a receiver coil and the reference signal being obtained from a reference coil on excitation of a transmitter coil, the signal conditioner including an analog divider for generating a ratio signal from the receiver signal and the reference signal, the signal conditioner providing an output signal correlated with the part position, the output signal being obtained from the ratio signal.

11. The apparatus of claim 10, the signal conditioner further including an oscillator, the receiver signal and the reference signal being obtained on excitation of the transmitter coil by the oscillator.

12. The apparatus of claim 10, the signal conditioner further including a circuit for multiplying an output from the analog divider by a supply voltage signal.

13. The apparatus of claim 10, wherein the signal conditioner further includes a virtual ground level adjuster, the output signal including a voltage adjustment controlled by the virtual ground level adjuster.

14. The apparatus of claim 13, wherein the voltage adjustment is stored in a non-volatile memory, the virtual ground level adjuster being in communication with the non-volatile memory.

15. The apparatus of claim 14, wherein the non-volatile memory is a zener array.

16. The apparatus of claim 10, wherein the receiver coil, the reference coil, the transmitter coil, and the signal conditioner are supported by a single printed circuit board.

17. A method of determining the part position of a moveable part, the method comprising:

exciting a transmitter coil using an alternating current;

obtaining a receiver signal from a receiver coil, the receiver signal being sensitive to the part position;

obtaining a reference signal substantially independent of the part position;

dividing the receiver signal by the reference signal in an analog divider circuit to provide a ratio signal;

adding a voltage adjustment to the ratio signal to obtain an output signal;

clamping the output signal between upper and lower plateau levels; and determining the part position using the output signal.

18. The method of claim 17, wherein the voltage adjustment is added to the ratio circuit by an analog adder.

19. The method of claim 17, the voltage adjustment being stored in a non-volatile memory.

* * * * *

UNITED STATES PATENT AND TRADEMARK OFFICE
CERTIFICATE OF CORRECTION

PATENT NO. : 7,292,026 B2  Page 1 of 1
APPLICATION NO. : 11/400154
DATED : November 6, 2007
INVENTOR(S) : Joong K. Lee It is certified that error appears in the above-identified patent and that said Letters Patent is hereby corrected as shown below:

Column 2, Line 37, replace "position may" with --position may have--

Column 4, Line 10, replace "voltage can then" with --voltage can then be--

Column 6, Line 42, replace "46" with --44--

Column 6, Line 63, replace "external resistors 60" with --external resistors 64--

Signed and Sealed this

Sixth Day of May, 2008

JON W. DUDAS
*Director of the United States Patent and Trademark Office*